Figure 1:
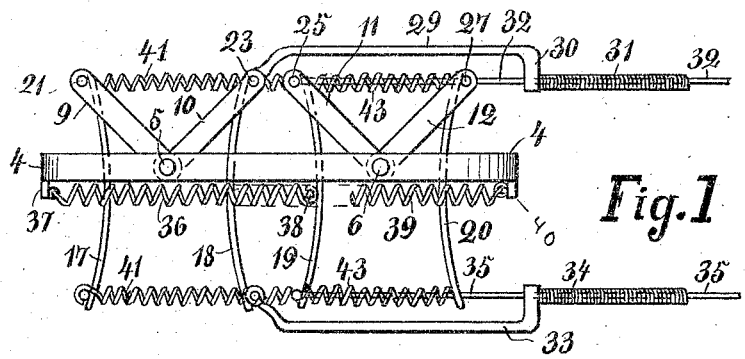

J. NIELSEN.
MILKING MACHINE.
APPLICATION FILED APR. 16, 1910.

978,473.

Patented Dec. 13, 1910.

3 SHEETS—SHEET 1.

Witnesses,
J. Reany Kelly
A. G. Mattoon

Inventor,
Jens Nielsen,
by B. Singer,
Att'y.

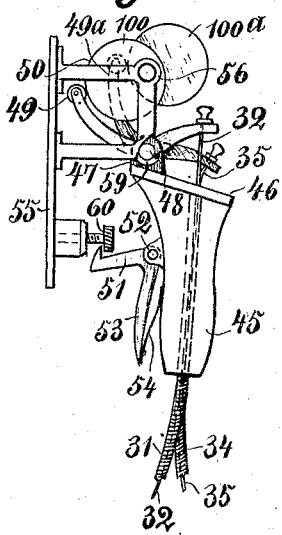
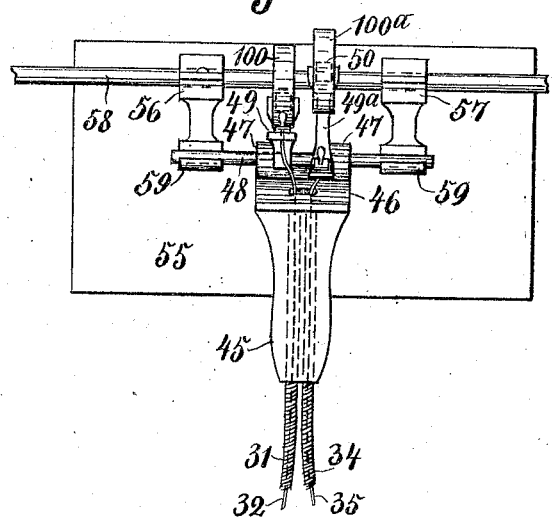
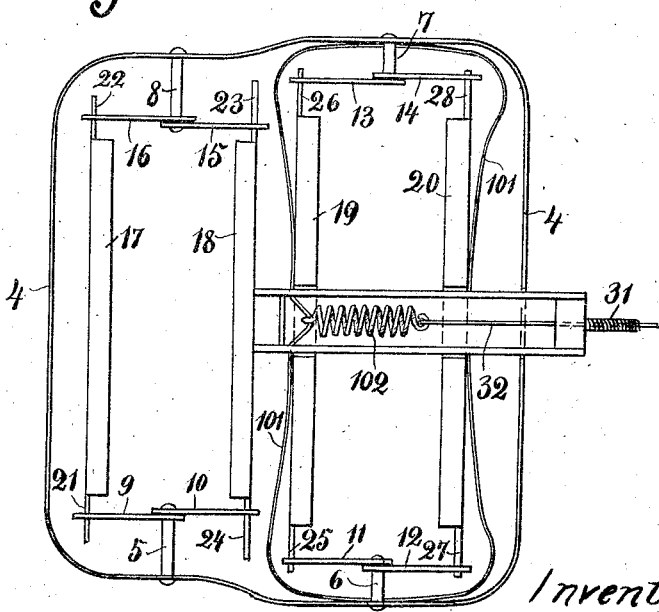

J. NIELSEN.
MILKING MACHINE.
APPLICATION FILED APR. 16, 1910.

978,473.

Patented Dec. 13, 1910.
3 SHEETS—SHEET 3.

Witnesses,

Inventor,
Jens Nielsen,
by B. Singer,
Atty.

UNITED STATES PATENT OFFICE.

JENS NIELSEN, OF COPENHAGEN, DENMARK.

MILKING-MACHINE.

978,473.  Specification of Letters Patent.  Patented Dec. 13, 1910.

Application filed April 16, 1910. Serial No. 555,783.

*To all whom it may concern:*

Be it known that I, JENS NIELSEN, a subject of the King of Denmark, and residing in Copenhagen, Denmark, have invented certain new and useful Improvements in Milking-Machines; and I do hereby declare the following to be a full, clear, and exact description of the invention.

This invention relates to milking-machines and more particularly to that kind of machines described in a U. S. Patent granted to me and bearing the No. 917,888. In these machines the milk is pressed out of the teats of the cow by means of shields applied to the teats and upon which a pressure is exerted.

An object of the invention is to provide a milking-machine in which milking members are actuated by means of flexible elements so that the operation of the machine may be performed from a distance.

Another object of the invention is to actuate the milking members alternately toward each other and away from each other, so as to imitate the action of hand milking.

Another object of the invention is to arrange the milking members in pairs and to actuate alternatingly pairs of the milking members by lifting and lowering the same and by simultaneously pressing the same against each other and removing the same from each other to more closely imitate hand milking.

Other objects will be more fully understood by referring to the following specification in connection with the accompanying drawings and they will be more fully pointed out in and by the appended claims.

The drawings show by way of example an embodiment of this invention and it will be understood that the invention is not limited to the specific combination and arrangement of parts shown in the drawing.

Figure 2:
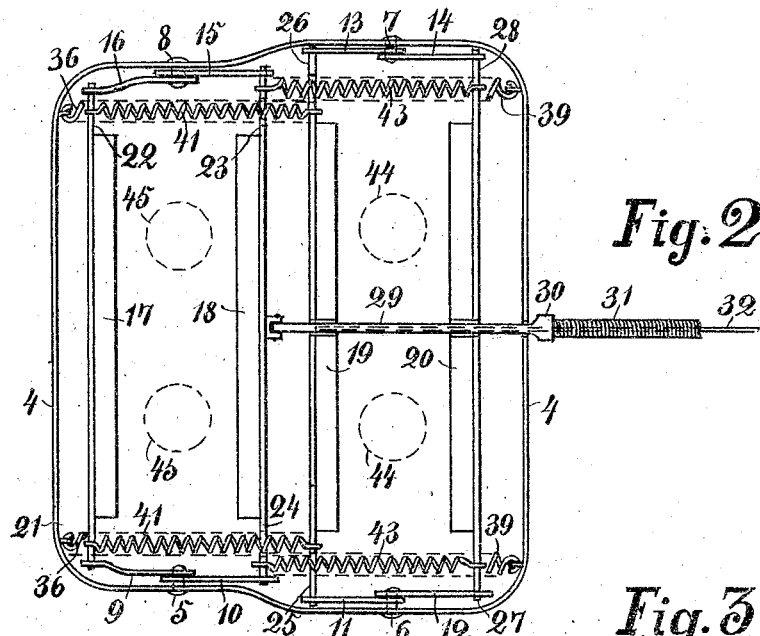
Figure 3:
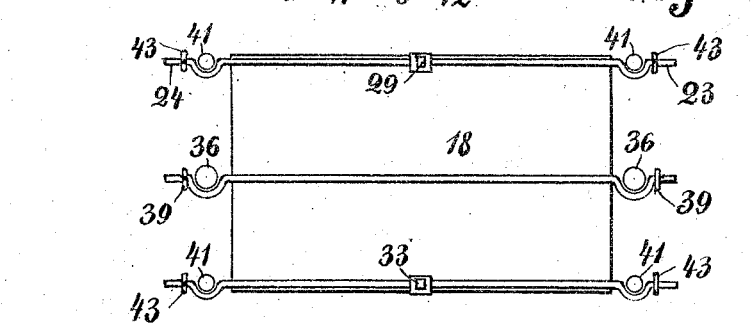
Figure 7:
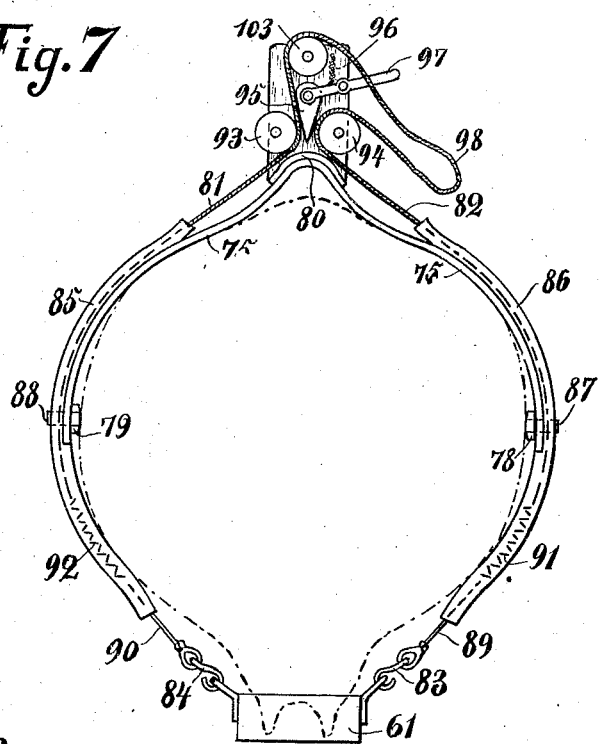
Figure 8:
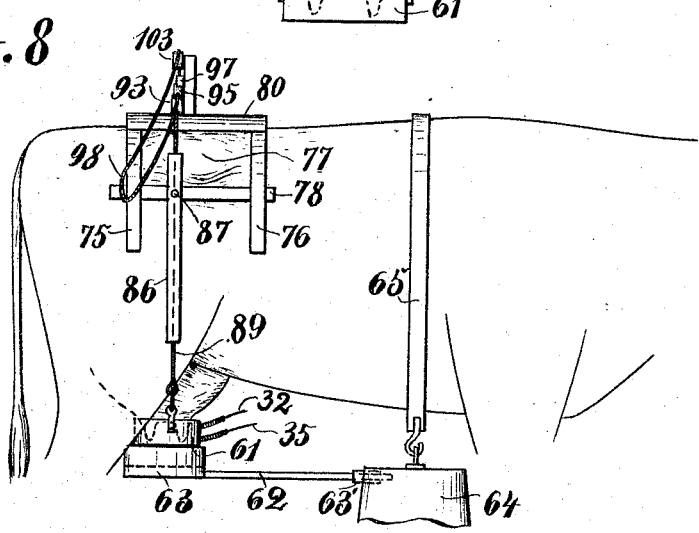

Figure 1 is a side elevation of a frame in which the milking members are mounted. Fig. 2 is a section through the same on a horizontal line. Fig. 3 is a rear elevation of a milking member. Fig. 4 is a side elevation of the actuated mechanism. Fig. 5 is a front elevation of the same. Fig. 6 is a section similar to Fig. 2, taken through the modified frame. Fig. 7 shows in front elevation the means for suspending the device on the animal to be milked. Fig. 8 is a side elevation of the same.

The milking-machine comprises a frame 4 preferably made of sheet iron or some other suitable metal and having the form of a hoop. The frame serves as a supporting device for pivots 5, 6, 7, and 8 from which the arms 9 and 10, 11 and 12, 13 and 14, 15 and 16 extend respectively. The arms are rotatably mounted at one end in these pivots and their other end is fastened to the milking members. The milking members 17, 18, 19 and 20 are arranged in coacting pairs 17—18 and 19—20 respectively. The embodiment shows the milking members having the form of slightly curved shields which are movably suspended on the arms extending from the frame of the machine. The member 17 is fastened to the arm 9 by means of the pivotal rod 21 and to the arm 16 by means of the pivot 22. In a similar way the member 18 is fastened to the arm 10 and 15 by means of the pivot 23 and 24 respectively. The other pair of milking members 19, 20 is fastened to the arms 11, 13, and 14, 12 respectively, and the pivots 25 and 26 serve as connecting means between the arm 11 and the member 19 and between the arm 13 and the member 19 respectively, while the milking member 20 is connected to the arms 12 and 14 by means of the pivots 27 and 28. The rod 29 shown in pivotal connection with the milking member 18 and extending above the members 19 and 20 serves as one of the means for actuating the same. The front end of the rod is provided with a projecting portion 30 against which a flexible element 31 is resting, said element having the form of a tube or hose and being non-compressible in longitudinal direction. This tubular element 31 surrounds another flexible element 32 which extends through the projection 32 and which is fastened to the upper portion of the milking member 19. This element 32 also is flexible but it is not extensible in longitudinal direction.

A rod 33 is in pivotal connection with the lower end of the milking member 18 and it is, similar to rod 29, at its front end provided with a projection extending upwardly. A flexible but not compressible element 34 abuts against the projection of the lower rod 33 and incloses a flexible but not extensible element 35 which is continued through the projection of the rod 33 which is fastened to the lower portion of the milking member 19. Two helical springs 36 disposed preferably in a plane parallel to the frame 4 are fastened to lugs 37 depending from said frame and at their other end they are secured to the center portion of the milking member 19. Pins 38 are fastened to the member 19 and serve as a mounting means for the springs 36. In a similar way one milking member of the other pair is in resilient connection with the opposite side of the frame 4. For this purpose 2 helical springs 39 also preferably disposed in a plane parallel to the frame 4 and preferably in the same plane with the springs 36 which fasten to the milking member 18 with one of their ends, while the other ends are connected to lugs 40 depending from the frame 4.

By reference to Fig. 3 in which the springs 36 are shown diagrammatically in the form of circles, it will be seen that the rod on the milking member 18 which serves for supporting the spring 39 is provided with offset portions to permit the passage of the springs 36. It is obvious that these resilient members 36 and 39 respectively are adapted to return the shields 18 and 19 into the starting position after the same have been moved toward their companion members 20 and 17 respectively. Each of the milking members 18 and 19 is resiliently connected with the companion member of the other pair. Thus the member 18 is in connection with the member 20 while the member 19 is resiliently connected with the member 17.

As resilient connecting means between the member 18 and the member 20, 4 springs are arranged in pairs, two of said springs connecting the upper portions of the shield 18 with the upper portions of the shield 20 while 2 springs 43 also serve for connecting the lower portions of these shields. In a similar way the member 19 is connected by means of 4 springs 41 to the member 17. By reference to Fig. 3 it will also be noted that the rods which serve for fastening the springs 43 to the milking member 18 are provided with offset portions near their ends, so as to permit the passage of the springs 41 therethrough.

In Fig. 2 the position of the teats with respect to the frame is indicated by dotted circles 44 and 45.

In the modification shown in Fig. 6 a resilient frame 101 is disposed about the milking shields 19 and 20, said frame being fastened to said shields and being laterally secured to the frame 4 by means of the rivet pins 6 and 7. The resiliency of the frame is adapted to hold the two milking members apart from each other and one of the members is connected with the actuating element 32 by means of a helical spring 102. The other pair of milking members 17 and 18 may be arranged in a way shown and described with reference to the Figs. 1, 2, and 3 or the same may also be provided with a frame similar to the frame 101.

The actuating elements 31, 32 34 and 35 are led to the driving mechanism shown in Figs. 4 and 5. The tubular members 31 and 34 are fastened to a movably suspended socket 45, while the members 32 and 35 extend through the socket and are fastened to two oscillating arms 49 and 49ª. The socket 45 is at its upper end provided with a plate 46 which serves as a closing means for the socket and from which extend 2 lugs 47. The lugs are provided with apertures and serve as ears for the shaft 48 extending therethrough. The shaft 48 is suspended in frames 56 and 57 which are fastened to the base plate 55 of the mechanism and are provided with bearings 59 for the shaft 48. The 2 levers 49 and 49ª oscillate about the shaft 48 and one arm of the same is provided with a roller. The other arm is provided with means for fastening the element 32 and 35 respectively to the same. The bell crank lever 51 is mounted movably in the lug 52 extending from the rear of the socket 45. One arm of the lever 51 projecting substantially in horizontal direction carries at its front end a hook while the other arm of said lever 53 extends downwardly and the spring 54 is interposed between the last named arm 53 and the socket 45 and by means of said spring the other arm 51 is pressed upwardly so as to enter into engagement with a screw 60, adjustably mounted on the base plate 55. The brackets 56 and 57 serve as bearings for the main shaft 58 which may be driven by some suitable means, not shown. Two cam disks 100 and 100ª are mounted on said shaft and in the rotation of the same they engage the roller 50 at the end of the arms 49 and 49ª respectively, imparting thereby the oscillatory movement to said arms and to the socket 45 which in the same way as the arms 49, is fastened to the shaft 48. It will be seen that by this mechanism as described and shown, a pull is exerted upon the flexible element 32 and 35 respectively. By suitable adjustment of the cam disk 100 and 100ª, the movement of these elements may take place alternately so that the milking members also are alternately moved to and fro. The screw 60 may be adjusted so that the same is adapted to hold the socket 45 at rest by engaging the hook at the front end of the arm 51.

In Figs. 7 and 8 means are shown for attaching the device on the body of the animal to be milked. The suspension means comprised in the embodiment shown in the drawing, 2 curved members preferably made of wood or metal 75 and 76 of a shape to lie flat on the back of the animal said members being interconnected by means of transverse members 78 and 79 on the side of the animal, a transverse member 80 on the highest point of the back. The last named transverse member 80 carries an upright for fastening thereto the cords 81 and 82 respectively which below the body of the animal end in hooks 83 and 84.

The milking apparatus as described above is preferably connected to these hooks. The cords 81 and 82 are preferably inclosed in curved pieces 85 and 86 which are rotatably mounted on the transverse member 78 and 79, by means of pivots 87 and 88 respectively. It is obvious that rotation of these tubular members or channels is impossible as long as the cord extending therethrough is under tension.

In the embodiment shown in Fig. 7 the strings 81 and 82 are not directly connected to the milking device, but some other tension members 89 and 90 are connected to said strings by interposition of springs 91 and 92 between the strings 81 and 82 and the tension members 89 and 90. It is therefore possible that the milking device is lowered or raised with respect to the body of the animal in accordance with the weight of the receptacle into which the milk is conveyed primarily from the udder. The strings 81 and 82 are guided over the pulleys 93 and 94 rotatably mounted on the upright which is attached to the transverse member 80. The string 81 is also guided over a pulley 103 and both of the strings 81 and 82 are united at 98. By exerting a pull on the loop 98 both of the strings 81 and 82 are drawn upwardly and the entire milking apparatus may be raised. A wedge 95 fastened to the front end of a lever 97 serves for holding the strings 81 and 82 in adjusted position by entering between the pulleys 93 and 94 and the spring 96 serves to press the wedge downwardly so that the same clamps the springs automatically against the pulleys and holds the milking apparatus in adjusted position.

The frame 4 is inclosed in its lower part by a receptacle 61. In Fig. 8 means are disclosed for conveying the milk from the receptacle 61 to a larger pail 64 which is secured to the body of the animal by means of a strap 65. A tubing 62 telescopingly extending with one end into the receptacle 61 and with its other end through the boss 63 into the pail 64 serves for conveying the milk from the machine into said pail.

The operation of the device is the following: The frame 4 is suspended from the animal by means of the strings 81 and 82 which are adjusted so that the teats of the animal are between the milking members 17, 18, 19 and 20. The elements 31, 32, 34 and 35 are secured to the driving mechanism disclosed in Figs. 4 and 5 and by rotation of the shaft 58 a pull may be effected alternately on the cord 32 and 35, while simultaneously a pressure is exerted in longitudinal direction upon the tubular elements 31 and 34. If the element 32 is pulled by raising the front portion of the arm 49, the upper part of the milking members of each pair are pressed against each other, entering thereby into engagement with the base of the teats. This action results from the mounting of the flexible element 32 immediately on the milking member 19 and from the mounting of the rod 29 which is connected to the tubular member 31 on the milking member 18. The movement of the milking member 18 is transferred to the milking member 20 by means of the springs 43 so that the milking member 20 is pressed toward the left when the milking member 18 is pressed in said direction, and the milking member 17 is moved toward the right when the milking member 19 is moved in the same direction. The movement of the milking members causes an oscillating of the pivotal arms 9, 10, 11, 12, 13, 14, 15 and 16, which are connected to the upper edges of the members. By this means the milking shields 17 to 20 are raised somewhat in the direction toward the base of the teats at the same time that they are brought in engagement with the same. By means of the cord 35 and the tubular member 34, a similar movement is transferred to the lower portion of the milking members, while at the same time the milking members are lowered somewhat through the action of the pivotal arms.

It will be seen that in the compression of the milking members toward each other at their lower ends, the upper portions of the same move apart from each other. The return movement of the shields is partly effected by the action of the springs 36 and 39.

I claim:

1. In a milking machine the combination of milking members arranged in pairs, and means engaging the milking members at their upper and lower edges for alternately moving the upper portions of the members of each pair toward each other and the lower portions of the members of each pair toward each other.

2. In a milking machine the combination of milking members arranged in pairs, and means engaging the milking members at their upper and lower edges for alternately moving the members of each pair toward each other and away from each other and for simultaneously lifting and lowering respectively the members of each pair.

3. In a milking machine the combination of a frame, milking members movably suspended in said frame, and flexible not extensible elements engaging a plurality of said members for imparting movement to the same, the milking members which are not engaged by said elements being connected to the members which are engaged by said elements.

4. In a milking machine the combination of a frame, milking members movably suspended in said frame, and flexible not extensible elements engaging a plurality of said members for imparting movement to the same, the milking members which are not engaged by said elements being resiliently connected to the members which are engaged by said elements.

5. In a milking machine the combination of a frame, milking members movably suspended in said frame and arranged in pairs, and flexible not extensible elements engaging one member of each pair for imparting movement to the same, the milking member which is free from engagement with said element in each pair being resiliently connected to the milking member in the other pair which is in engagement with said elements.

6. In a milking machine the combination of a frame, plurality of arms pivotally connected with the frame, milking members pivotally suspended from said arms and arranged in pairs, a plurality of springs arranged in pairs and connecting the upper edge, middle portions, and lower edge of the milking member of one pair with the corresponding portions of the milking member of the other pair, and flexible not extensible elements in engagement with one member of each pair for imparting movement to the same.

7. In a milking machine the combination of a frame milking members movably suspended in said frame and flexible not extensible elements engaging a plurality of said members for imparting movement to the same, one of said elements surrounding another of said elements.

8. In a milking machine the combination of a frame, milking members movably suspended in said frame and arranged in pairs, flexible not extensible elements arranged in pairs, said pairs of elements engaging the upper and the lower edge of one member of each pair of members and means for alternately exerting a pull upon each pair of elements.

9. In a milking machine the combination of a frame, milking members movably suspended in said frame and arranged in pairs, a pair of cords engaging a member of one pair, near the edges of said member, a pair of hose surrounding said cord and connected to the edge portions of a member of another pair and means for alternately exerting a pull upon each cord and hose.

10. In a milking machine the combination of milking members, flexible not extensible elements for imparting movement to said milking members, levers to which said elements are attached at one end, and means for alternately depressing the free end of said levers.

11. In a milking machine the combination of milking members, flexible not extensible elements for imparting movement to said members, a socket for receiving said elements, levers to which said elements are attached at one end, means for alternately depressing the free end of said levers and imparting movement to said socket in one direction and resilient means for returning said socket.

12. In a milking machine the combination of milking members, means for alternately moving said members toward and away from each other, a plurality of yielding elements, adapted to surround the body of the animal to be milked, tubes inclosed in said elements, and a resilient suspending means for the milking machine disposed in said tube.

13. In a milking machine the combination of milking members, means for alternately moving said members toward and away from each other, adjustable means for suspending the machine from the body of the animal to be milked, said means inclosing resiliently said body, a sieve reservoir adapted to receive the milk from the machine, a milk pail and an adjustable tubing connecting said pail with said reservoir.

14. In a milking machine the combination of milking members, means for alternately moving said members toward and away from each other, adjustable means for suspending the machine from the body of the animal to be milked, said means inclosing resiliently said body, a sieve reservoir adapted to receive the milk from the machine, a pail, an adjustable tubing connecting said pail with said reservoir, and means for suspending said pail.

In testimony whereof I affix my signature in presence of two witnesses.

JENS NIELSEN.

Witnesses:
  HANS PETERSEN,
  CARL KROGH.